(12) United States Patent
Beatty

(10) Patent No.: US 6,313,385 B1
(45) Date of Patent: *Nov. 6, 2001

(54) MUSIC TEACHING SYSTEM AND METHOD

(76) Inventor: Kristina M. Beatty, 17036 George O'Neal, Baton Rouge, LA (US) 70817

(*) Notice: Subject to any disclaimer, the term of this patent is extended or adjusted under 35 U.S.C. 154(b) by 0 days.

This patent is subject to a terminal disclaimer.

(21) Appl. No.: 09/255,886

(22) Filed: Feb. 23, 1999

Related U.S. Application Data

(63) Continuation of application No. 08/147,907, filed on Nov. 3, 1993, which is a continuation of application No. 07/969,557, filed on Oct. 30, 1992, now abandoned, which is a continuation of application No. 07/750,955, filed on Aug. 28, 1991, now abandoned.

(51) Int. Cl.[7] .................................................. G09B 15/00
(52) U.S. Cl. ............................................................ 84/470 R
(58) Field of Search ................................ 84/406, 470 R, 84/471 R, 476, 477 R, 483.1, 484, 485 R

(56) References Cited

U.S. PATENT DOCUMENTS

| | | |
|---|---|---|
| 1,085,603 | 2/1914 | Grant . |
| 1,275,869 | 8/1918 | Deal . |
| 1,392,977 | 10/1921 | Swan . |
| 1,526,547 | 2/1925 | Hughey . |
| 2,582,544 | 1/1952 | Johnson . |
| 2,807,183 | 9/1957 | Ney ........................................ 84/471 |
| 3,027,794 * | 4/1962 | Chute ..................................... 84/406 |
| 3,041,778 | 7/1962 | Seron ....................................... 46/22 |
| 3,355,837 | 12/1967 | Pedersen ................................. 46/17 |
| 4,213,372 * | 7/1980 | Sasaki et al. ....................... 84/470 R |
| 4,552,534 | 11/1985 | Krempel ................................ 434/170 |
| 4,669,353 | 6/1987 | Kvistad ................................. 84/403 |
| 4,819,539 * | 4/1989 | Searing ................................. 84/476 |

* cited by examiner

Primary Examiner—Bentsu Ro
Assistant Examiner—Kim Lockett

(57) ABSTRACT

A music teaching system is provided, comprising at least two musical instruments, each instrument having a mechanism for producing a musical note when the means is activated, each such mechanism being marked by a color corresponding to the particular musical note produced by the mechanism; and at least two display vehicles for displaying a combination of the colors. The invention may be accomplished using colored hand bells for the instruments and cards for the display vehicles. A method for playing musical notes is also provided utilizing the teaching system (which may include hand bells and cards) comprising the steps of displaying a first card displaying a combination of colors for a first period of time; playing those colored hand bells corresponding to the combination of colors displayed on the first card during said first period of time; removing the first card from view; displaying a second card for a desired second period of time; playing those hand bells corresponding to the combination of colors displayed on the second card the second period of time; and removing the second card from view.

9 Claims, 2 Drawing Sheets

MUSIC TEACHING SYSTEM AND METHOD

STATEMENT OF PRIORITY

This application is a continuation of application Ser. No. 08/147,907 filed on Nov. 3, 1993 which was a continuation of application Ser. No. 07/969,557 filed on Oct. 30, 1992, which was a continuation of application Ser. No. 07/750,955 filed on Aug. 28, 1991, both abandoned.

BACKGROUND OF THE INVENTION

1. Field of the Invention

This invention relates generally to music teaching systems and methods and, more particularly, to music teaching systems and methods which are used to acquaint young children with music and musical instruments.

2. Prior Art

Many music teaching systems have been devised to acquaint young children with musical endeavors. However, prior art teaching methods concentrate on teaching musical notation rather than initial performance of musical compositions. Because of this focus, prior art teaching systems and methods are somewhat complex for young novices to learn.

Some attempts have been made to use color to aid in teaching music. Colored hand bell sets are currently sold, with each hand bell and its associated musical note being marked with a color. Corresponding colored notes are depicted on a musical staff, shown on a large chart. The instructor then points to the colored notes on the staff and the students play the bells corresponding to the colored notes. Children have difficulty concentrating on the chart, since multiple notes are shown on the chart, and the musical staff notation can be initially confusing. Other prior art systems also display of entire lines of music, utilizing various means to associate the musical note(s) played with the one(s) displayed. While the use of multiple musical instruments (such as hand bells) encourages group participation and interest, the problems of overall instructor control and elicitation of the proper response remain.

SUMMARY OF THE INVENTION

Therefore, it is an object of this invention to provide a music teaching system and method which requires no knowledge of music in order to participate.

It is another object of this invention to provide a music teaching system and method which allows an instructor to control group participation in the playing of a composition for each combination of musical notes played.

It is still another object of this invention to provide a music teaching system and method which requires a minimum amount of time for the student to learn, and which allows the student to immediately participate in the playing of a musical composition.

It is a further object of this invention to provide a music teaching system and method which is low in cost.

It is another object of this invention to provide a music teaching system and method which accomplishes various combinations of the above objects.

Accordingly, a music teaching system is provided, comprising at least two musical instruments, each instrument having a mechanism for producing a musical note when the means is activated, each such mechanism being marked by a color corresponding to the particular musical note produced by the mechanism; and at least two display vehicles for displaying a combination of the colors. The invention may be accomplished using colored hand bells for the instruments and cards for the display vehicles. A method for playing musical notes is also provided utilizing the teaching system (which may include hand bells and cards) comprising the steps of displaying a first card displaying a combination of colors for a first period of time; playing those colored hand bells corresponding to the combination of colors displayed on the first card during said first period of time; removing the first card from view; displaying a second card for a desired second period of time; playing those hand bells corresponding to the combination of colors displayed on the second card the second period of time; and removing the second card from view.

DETAILED DESCRIPTION OF PREFERRED EMBODIMENTS OF THE INVENTION

Figure 1:
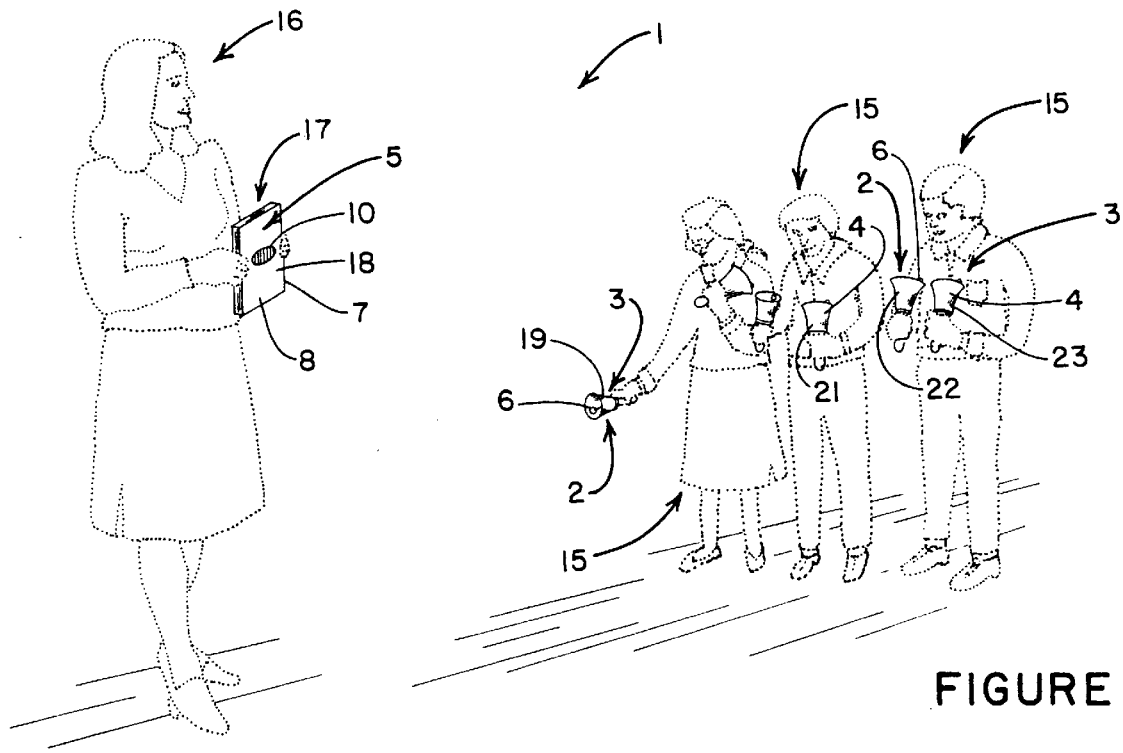
FIG. 1 is a perspective view of an embodiment of the invention in use.

As shown in FIG. 1, the music teaching system 1 generally comprises a plurality of musical instruments 2, preferably hand bells 6, which are each held by a student 15, and a plurality of means 5 for displaying a combination of colors. Of course, a student 15 may hold one hand bell 6 in each hand, as shown in FIG. 1. For young students 15, it is preferable that each student 15 hold only one instrument 2. Other instruments 2 may be used. However, for young students 15, hand bells 6 have produced excellent results. Each instrument 2 has a means 3 for producing a musical note when the means 3 is activated. With hand bells 6, means 3 and hand bell 6 comprise the same unit. However, for other musical instruments 2, such as those capable of playing more than one note, means 3 may comprise a part of the instrument 2, such as a key on an electronic keyboard (not shown). Means 3 is marked with a color 4, corresponding to the musical note played by means 3. In its simplest preferred form, a display object such as means 5 comprises a card 7 (contained in a deck 17 of cards 7) having colors 10 displayed on the front side 8 thereof corresponding to the colors 4 on means 3.

Figure 2:
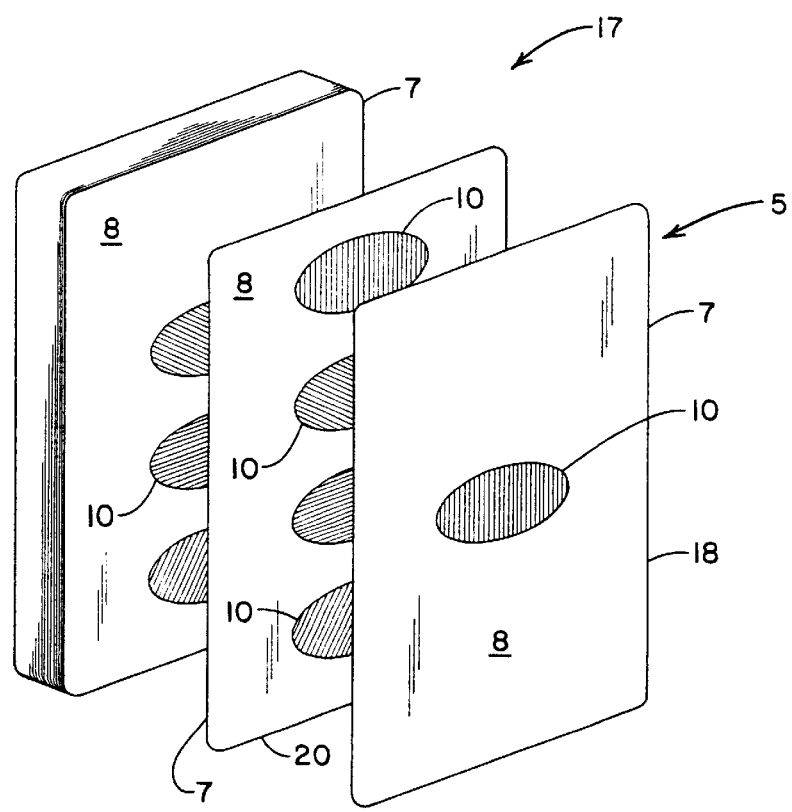
FIG. 2 is a perspective view of the front sides of the cards of an embodiment of the invention.
Figure 3:
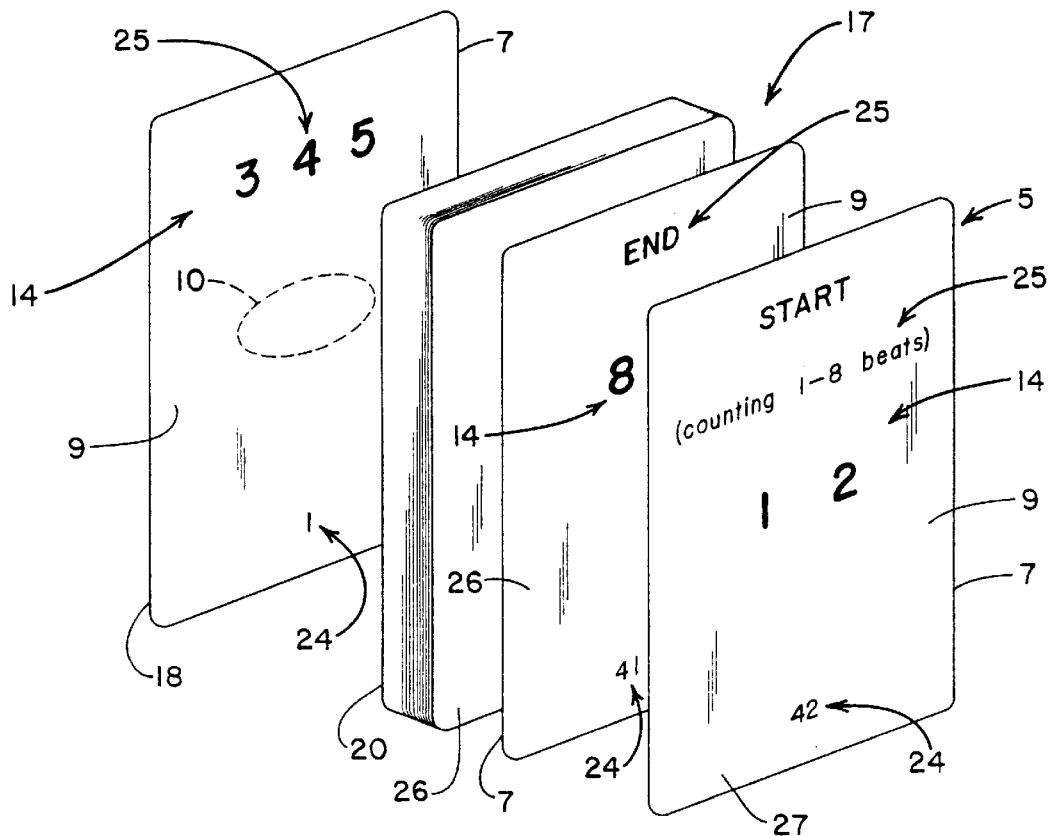
FIG. 3 is a perspective view of the back sides of the cards of an embodiment of the invention.

As shown in FIGS. 2 and 3, the organization of a deck 17 of cards 7 is simple. The front side 8 of each card 7 displays a desired combination of colors 10. For the purpose of this application, the word "combination" is intended to mean "one or more" when referring to a combination of colors or musical notes. Thus, first card 18 instructs the student 15 holding a red hand bell 19 to play it for as long as card 18 is displayed. Second card 20 instructs those students 15 holding red, green, blue and brown hand bells 19, 21, 22, 23 to play them for as long as card 20 is displayed. The number of cards 7 in deck 17 may correspond to a desired number of combinations of musical notes to be played on instruments 2, such as those combinations of a musical composition. Thus, decks 17 of cards 7 may be provided for several musical compositions providing variety for the students 15.

To aid the instructor/facilitator 16, instructions 14 or other additional information may be provided on the back side 9 of each card 7, as shown in FIG. 3. Card numbers 24 are provided to allow the facilitator 16 to maintain the proper order of cards 7. Further, other information 25 may be provided, such as musical beat counting instructions and start and finish instructions, as shown. For the composition represented by the deck 17 shown in FIG. 3, instructions 14 first card 18 (card number 1) are shown on the back side 9 of last card 27 (card number 42). Instructions 14 for last card 27 (card number 42) are shown on the back side 9 of the second to last card 26 (card number 41). Thus, facilitator would display first card 18 for two musical beats, move the first card to the back of the deck 17, uncovering and displaying the second card in the deck 17 for three musical beats (as instructed on the back side 9 of first card 18).

Figure 4:
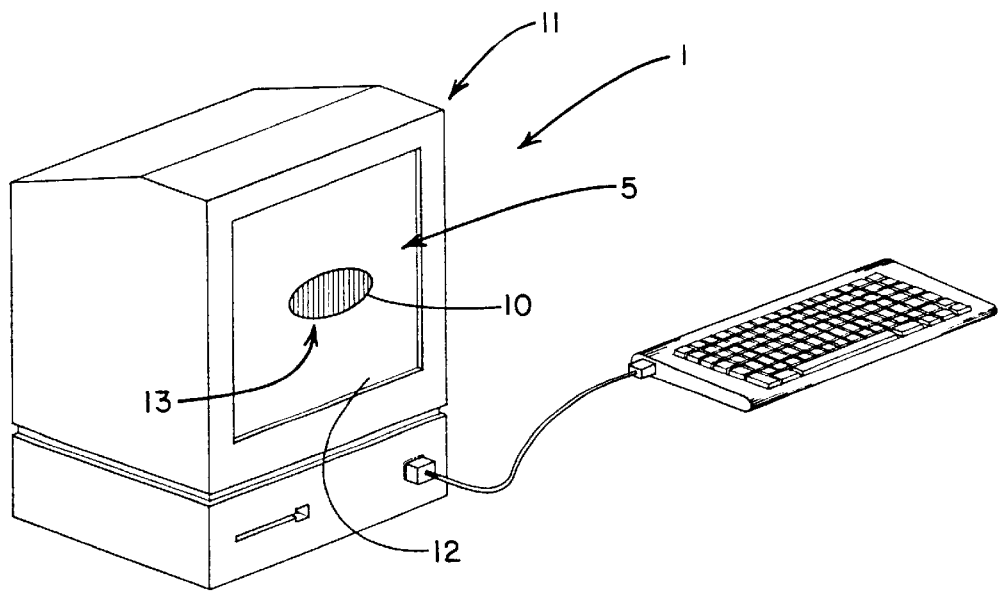
FIG. 4 is a perspective view of the computer system and typical screen of an embodiment of the invention.

An alternate embodiment of the invention 1 is shown in FIG. 4. Means 3 may be generated by a computer system 11, such as a personal computer system having a screen 12. Computer system 11 is programmed to produce a desired sequence of images 13 on screen 11 corresponding to a sequence of combinations of musical notes. Computer system 11 may thus supplant facilitator 16, if desirable. The image 13 shown in FIG. 4 thus corresponds to the front side 8 of first card 18.

The method of using the teaching system 1 is simple, and gives the facilitator 16 control over the teaching/performing situation. A first means 5 (such as first card 18 or a first image 13 on screen 12) is displayed for a first period of time (such as two musical beats as shown on the back side 9 of last card 27). During the first period of time, means 3 (such as red hand bell 19) is activated and a musical note(s) corresponding to the color(s) 10 displayed is played by the student 15 holding the appropriate colored means 3. First means 5 is then removed from view, and the student 15 ceases to play the note. A second means 5 is then displayed (such as second card 20) and the process is repeated for the colors 10 and associated colors 4 on the appropriate means 3. The process continues until the musical composition is complete. It has been found that beautiful chords and melodies can be produced utilizing the system 1 by students 15 with no musical background whatsoever, and without any reference to music notation. Other embodiments of the invention will occur to those skilled in the art, and are intended to be included within the scope and spirit of the following claims.

I claim:

1. A method for playing musical notes utilizing a plurality of hand bells, each said hand bell being marked by an indicium corresponding to the particular musical note produced by said hand bell; a plurality of means for displaying only a single combination of said indicia corresponding to a single musical note or a single musical chord, said plurality of means for displaying comprising a deck comprising a plurality of cards, wherein on each said card at least one said indicium is displayed and on at least one said card a plurality of said indicia are displayed, and wherein said cards are arranged in a desired order corresponding to a sequence of musical notes or chords, said method comprising the steps of:

a. displaying said indicia of a first said card for a first period of time, while not displaying said indicia of any other said card during said first period of time;
   b. playing those said hand bells having indicia corresponding the indicia of said first card during said first period of time;
   c. removing said first card from view;
   d. displaying said indicia of a second said card for a desired second period of time;
   e. playing those said hand bells corresponding to said combination of said indicia displayed on said second card during said second period of time; and
   f. removing said second card from view.

2. The method of claim 1, wherein said indicia comprise colors.

3. A method for playing musical notes utilizing a plurality of hand bells, each said hand bell being marked by an indicium corresponding to the particular musical note produced by said hand bell; a means for displaying only a single combination of said indicia corresponding to a single musical note or a single musical chord, said means for displaying comprising a computer system having a screen; and wherein said computer system is programmed to produce a desired sequence of said single combinations of said indicia on said screen corresponding to a sequence of said single musical notes or single musical chords, said method comprising the steps of:

a. displaying on said screen a first said single combination of said indicia for a first period of time, while not displaying any other indicia during said first period of time;
   b. playing those said hand bells having indicia corresponding the indicia of said first single combination during said first period of time;
   c. ceasing to display said first single combination on said screen;
   d. displaying on said screen a second said single combination of said indicia for a second period of time, while not displaying any other indicia during said second period of time;
   e. playing those said hand bells having indicia corresponding the indicia of said second single combination during said second period of time; and
   f. ceasing to display said second single combination on said screen.

4. The method of claim 3, wherein said indicia comprise colors.

5. A music teaching system, comprising a plurality of hand bells, each said hand bell being marked by an indicium corresponding to the particular musical note produced by said hand bell; a plurality of display objects having only a single combination of said indicia corresponding to a single musical note or a single musical chord, wherein on each said display object, at least one said indicium is displayed, and on at least one said display object, a plurality of said indicia are displayed, and wherein said display object, are arranged in a desired order corresponding to a sequence of musical notes or chords.

6. A music teaching system according to claim 5, wherein said indicia comprise colors.

7. A music teaching system according to claim 5, wherein said display objects comprise cards.

8. A music teaching system according to claim 5, wherein said display objects comprise a series of images generated by a computer.

9. A music teaching system, comprising:

a. a plurality of hand bells, each said hand bell being marked by a color corresponding to a particular musical note produced by said hand bell; and
   b. a means for displaying only a single combination of said colors corresponding to a single musical note or a single musical chord, said means for displaying comprising a computer system having a screen, said screen having at least one said color displayed thereon; and
   wherein said computer system is programmed to produce a desired sequence of said single combinations of said colors on said screen corresponding to a sequence of said single musical notes or said single musical chords.

* * * * *